(12) United States Patent
Martin

(10) Patent No.: US 6,776,265 B2
(45) Date of Patent: Aug. 17, 2004

(54) DEVICE FOR INDICATING THE TOTAL LOAD IN THE CASE OF BRAKE DISKS MADE OF CARBON-FIBER-REINFORCED CERAMIC MATERIAL

(75) Inventor: Roland Martin, Aalen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 117 days.

(21) Appl. No.: 10/101,208

(22) Filed: Mar. 20, 2002

(65) Prior Publication Data

US 2002/0144866 A1 Oct. 10, 2002

(30) Foreign Application Priority Data

Apr. 4, 2001 (DE) .......................................... 101 16 661

(51) Int. Cl.$^7$ .............................................. F16D 66/00
(52) U.S. Cl. .............................. 188/1.11 R; 188/251 R; 188/251 A
(58) Field of Search ...................... 188/1.11 R, 1.11 W, 188/73.1, 218 XL, 251, 1.11 L, 250 G, 250 B; 192/107 M, 30 W; 340/453, 454; 116/208, 206; 701/29

(56) References Cited

U.S. PATENT DOCUMENTS

2002/0144866 A1 * 10/2002 Martin ................. 188/1.11 W
2002/0153214 A1 * 10/2002 Bauer et al. ............ 188/251 A
2002/0161494 A1 * 10/2002 Martin ...................... 340/454

FOREIGN PATENT DOCUMENTS

| DE | 2749772 C2 | 5/1983 |
|---|---|---|
| DE | 4438455 C1 | 5/1996 |
| DE | 19651798 A1 | 6/1998 |
| DE | 19834542 A1 | 2/2000 |
| DE | 10116661 | * 10/2002 |
| EP | 0670434 A1 | 9/1995 |
| EP | 0926111 A2 | 6/1999 |
| EP | 1052422 A2 | 11/2000 |
| EP | 1248009 | * 10/2002 |
| FR | 2620499 A1 | 3/1989 |

* cited by examiner

Primary Examiner—Douglas C. Butler
(74) Attorney, Agent, or Firm—Crowell & Moring LLP

(57) ABSTRACT

A device can indicate the total load of a brake disk made of carbon-fiber-reinforced ceramic material. In order to create such a device, which can be used for brake disks and other friction elements made of carbon-fiber-reinforced ceramic material, an indicator element can be provided in the brake disk starting from the friction surface. The oxidation stability of this indicator element is reduced with respect to the material of the brake disk.

16 Claims, 3 Drawing Sheets

DEVICE FOR INDICATING THE TOTAL LOAD IN THE CASE OF BRAKE DISKS MADE OF CARBON-FIBER-REINFORCED CERAMIC MATERIAL

This application claims the priority of German application 101 16 661.3, filed Apr. 4, 2001, the disclosure of which is expressly incorporated by reference herein.

BACKGROUND AND SUMMARY OF THE INVENTION

The present invention relates to a device for indicating the total load in a brake disk made of carbon-fiber-reinforced ceramic material, as well as to methods of providing such a device and indicating such a total load.

Brake disks of this type are known from German Patent Documents DE 44 38 455 C1 and DE 198 34 542 A1. German Patent Document DE 44 38 455 C1 shows a method of producing a friction unit in which a porous carbon body is infiltrated with liquid silicium. Here, the silicium, together with the carbon, converts to silicon carbide (SiC). The carbon body is preferably constructed as a carbon fiber body. If a wheel unit, which here is a brake disk, is assembled of two halves, recesses can be made in the carbon bodies before ceramization. These recesses will then, as a result of assembling the carbon bodies, complement one another to form a joint cavity such as, for example, a cooling duct. German Patent Document DE 198 34 542 A1 also discloses a method of producing bodies which contain reinforcing fibers. In contrast to the method of German Patent Document DE 44 38 455 C1, here, fibers, fiber bundles, or fiber agglomerates are used and aligned such that the reinforcing fibers in the area of the recesses in the brake disk are oriented approximately parallel to lateral edges of the recesses.

As a result of high loads, the known fiber-reinforced ceramic materials experience a progressive total loading in the sense of damage; however, no signs of damage are visible to the outside. In particular, it is not possible to detect, as in known brake disks made of ferrous materials, the total load by way of the abrasion of material. In brake disks made of a fiber-reinforced ceramic material, this abrasion of material amounts to only a few grams and, furthermore, is not an indicator of damage to the brake disk.

It is an object of the invention to provide a device for indicating the total load which can be used for brake disks and other friction elements made of carbon-fiber-reinforced ceramic material.

According to the invention, this object is achieved by way of an indicator element provided in the brake disk so as to start from a friction surface of the brake disk and having an oxidation stability which is reduced with respect to the material of the brake disk. The invention is based on a recognition that, with respect to the material of the above-mentioned type for the brake disk, damage occurs mainly by oxidation of the carbon fibers. As a result of a reduction in the oxidation stability in comparison to the material of the brake disk, the indicator element clearly wears more rapidly than the brake disk material, so that the burning-off of the indicator element can be clearly detected and can be used as a measurement of the total load of the brake disk.

Other advantageous features of the invention are reflected in dependent claims.

It is suggested to produce the indicator element of a carbon material. Such a material may, for example, be graphite, moldings made of carbon fiber, sintered carbon materials, or organic binders, as they are used for brake linings. These materials consist of carbon so that, as a function of the temperature, their oxidation behavior corresponds to the oxidation behavior of the carbon fibers of the brake disk. Organic materials, at first, do not consist of pure carbon. However, during the first heatings as a result of braking operations, these materials are converted to carbon due to coking, and their oxidation behavior will again correspond to that of a carbon fiber.

Furthermore, it is suggested to construct the indicator element in the shape of a pin and to insert it into a bore in the brake disk. As a result of this indicator element construction, production and arrangement of the indicator element in the brake disk are simplified considerably because pins and bores, respectively, can be produced in a simple and cost-effective manner. This arrangement is particularly advantageous with a brake disk which is already provided with bores. In such a brake disk, one of the bores, which exists anyhow, can be used for accommodating the indicator element.

Finally, it is suggested to connect the indicator element with the brake disk by a silicon-carbide-containing layer. This preferably takes place by inserting the indicator element into the brake disk before siliconizing the brake disk. The edge layer of the indicator element is also siliconized during the siliconizing process so that a connection layer between the brake disk and the indicator element is formed without any additional process steps. Furthermore, it is possible to insert the indicator element into the formed carbon body while the body is in its preliminary stage—a green compact—rather than later, and to carbonize it together with the green compact. Particularly with an indicator element made of an organic material, this method can be used to also carbonize the organic material and thus establish a defined condition of the indicator element. After siliconizing, care should be taken to free the indicator element from a silicon carbide layer which may be situated in the area of the friction surface of the brake disk in order to create a good working surface for oxidation of the indicator element.

The invention will be described in detail by way of an embodiment illustrated in the figures.

DETAILED DESCRIPTION OF THE INVENTION

Figure 1:
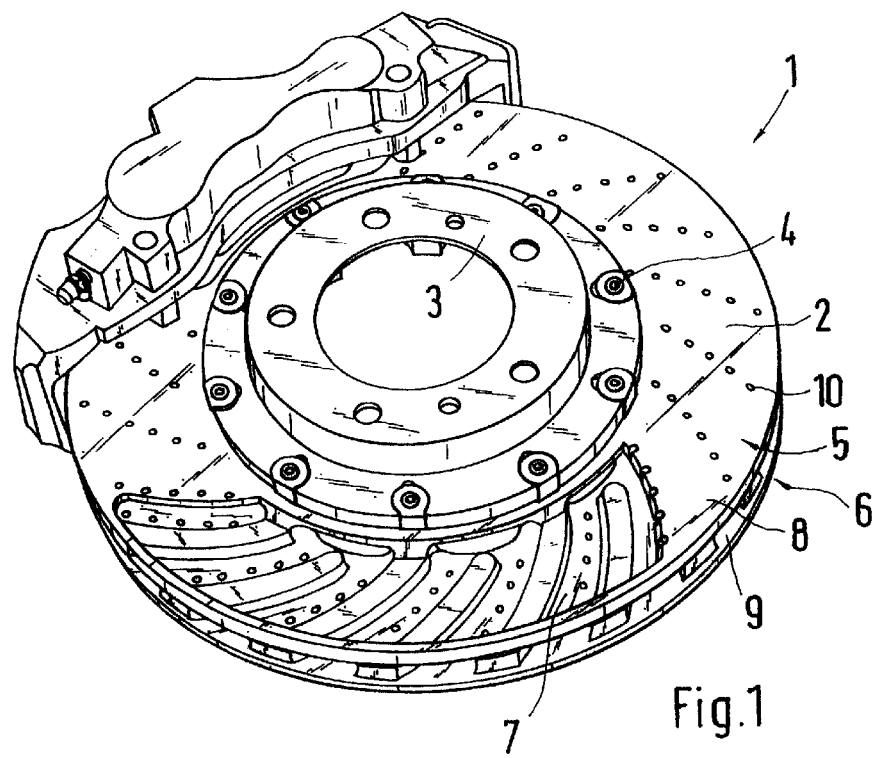
FIG. 1 is a view of a brake disk made of carbon-fiber-reinforced ceramic material.

The brake disk 1 illustrated in FIG. 1 includes a brake ring 2 which is connected by fastening elements 4 with a pot 3. The brake ring 2 is produced of two halves 5, 6 which are inseparably connected with one another in the course of the production process. The brake ring 2 has an internally ventilated construction and cooling ducts 7 between friction disks 8, 9. On their exterior sides, the friction disks 8, 9 form the friction surfaces of the brake disk 1. In the area of the cooling ducts 7, the friction disks 8, 9 are provided with bores 10, and each of these bores extends completely through one of the brake disks 8, 9.

Figure 2:
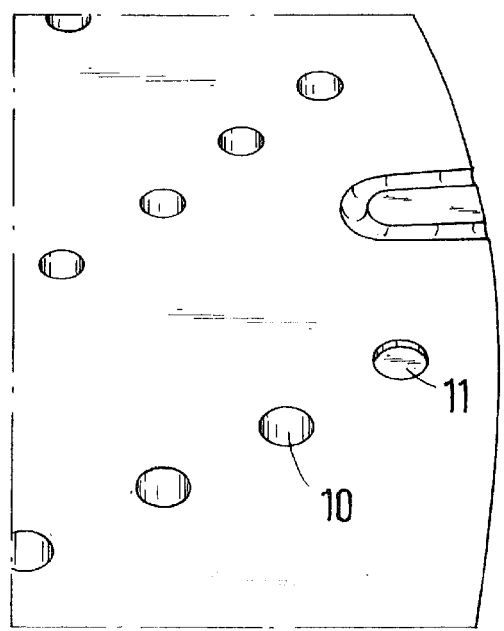
FIG. 2 is a detailed view of an indicator element in the brake disk.

FIG. 2 is a view of a portion of the friction surface of one of the friction disks 8, 9. A pin-shaped indicator element 11 is arranged in one of the bores 10. The indicator element 11 has a pin-shaped construction and is dimensioned such that its outside diameter corresponds to the diameter of the bores 10.

Figure 3:
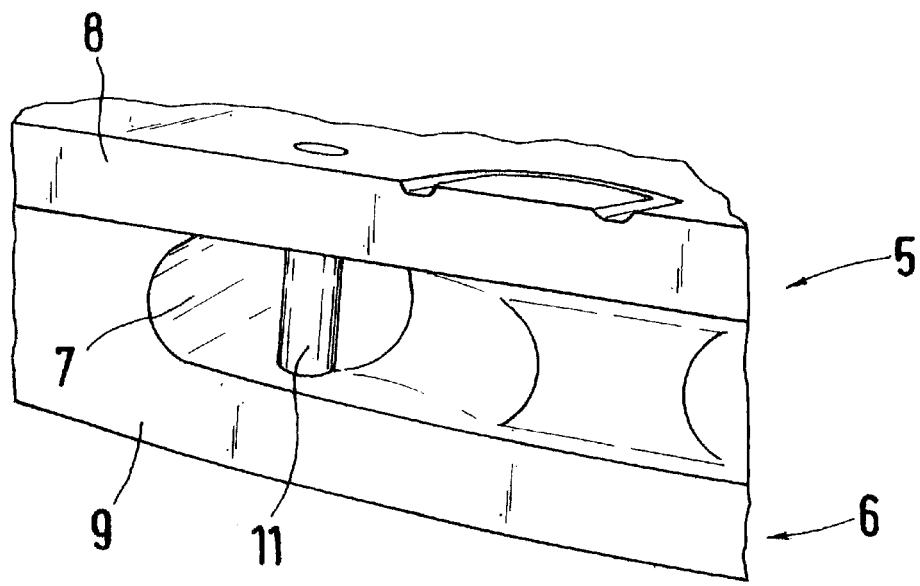
FIG. 3 is a lateral view of the brake disk with an indicator element.

As illustrated in FIG. 3, the indicator element 11 penetrates the two friction disks 8, 9 such that a portion of the indicator element 11 stands free in the cooling duct 7.

Figure 4:
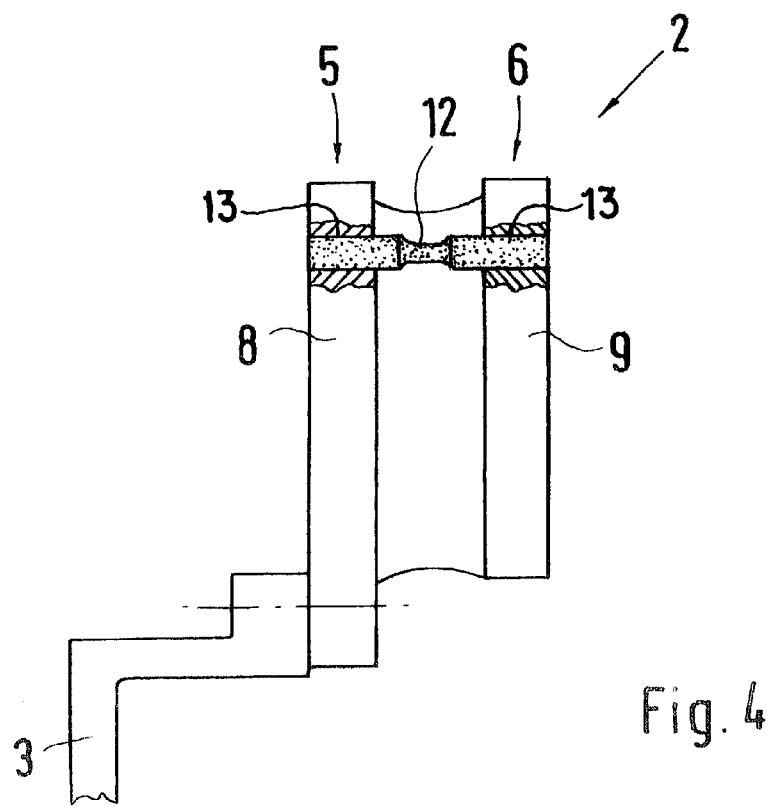
FIG. 4 is a partial cross-sectional view of a brake disk with an indicator element.

The cross-sectional view of the brake disk 1 according to FIG. 4 again shows the position of the indicator element within the brake disk 1. The indicator element 11 is connected with the friction disks 8, 9 by a silicon-carbide-containing layer 13. The indicator element—here, a graphite pin—has the characteristic feature in comparison to the construction according to FIG. 3 that its central area 12 situated in the area of the cooling duct 7 is stripped in order to reduce the amount of material outside the friction disks 8, 9.

Figure 5:
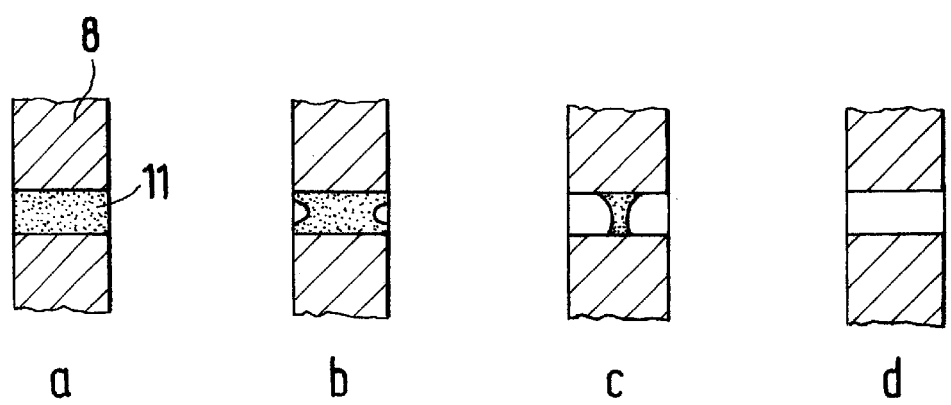
FIGS. 5a, 5b, 5c, and 5d are representations of the course of the damage to the indicator element.

FIG. 5 shows the course of the damage to the indicator element 11 and thus the function of the indicator element 11 as an indicating device for the total load of the brake disk 1. FIG. 5a is a cut-out of the indicator element 11 in the area of the friction disk 8 in the new condition. FIG. 5b shows that the indicator element 11 has first burn-off areas 12. These burn-off areas are easily recognizable after the brake disk 1 is exposed to blown compressed air, and can be measured, for example, by way of a probing needle (caliper needle). FIG. 5c shows the indicator element 11 with progressive damage. The burn-off areas 12 now take up a major portion of the bore 10. In FIG. 5d, the total load of the brake disk 1 has finally progressed so far that the indicator element 11 has disappeared completely.

In the present example, the indicator element 11 is designed such that its complete burning-up, as illustrated in FIG. 5, is an indication that the brake disk 1 has reached its permissible total load and should be exchanged. In this case, the permissible total load should be selected such that, even at a continued load of the brake disk, failure of the brake disk 1 is not expected for the short term.

As an alternative, the indicator element 11 can also be designed such that a certain depth of the burn-off areas 12 indicates a permissible total load has been reached.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A device for indicating a total load in a brake disk made of carbon-fiber-reinforced ceramic material, comprising an indicator element provided so as to start from a friction surface of the brake disk and having an oxidation stability which is reduced with respect to the material of the brake disk.

2. The device according to claim 1, wherein the indicator element consists of a carbon material.

3. The device according to claim 1, wherein the indicator element has a pin-shaped construction and is inserted into a bore in the brake disk.

4. The device according to claim 1, wherein the indicator element is connected with the brake disk by a silicon-carbide-containing layer.

5. The device according to claim 2, wherein the indicator element has a pin-shaped construction and is inserted into a bore in the brake disk.

6. The device according to claim 5, wherein the indicator element is connected with the brake disk by a silicon-carbide-containing layer.

7. The device according to claim 2, wherein the indicator element is connected with the brake disk by a silicon-carbide-containing layer.

8. The device according to claim 3, wherein the indicator element is connected with the brake disk by a silicon-carbide-containing layer.

9. A method of providing a device for indicating a total load in a brake disk made of carbon-fiber-reinforced ceramic material, comprising:

providing an indicator element having an oxidation stability below that of the material of the brake disk, and starting the indicator element from a friction surface of the brake disk.

10. The method according to claim 9, wherein the indicator element consists of a carbon material.

11. The method according to claim 9, wherein the indicator element has a pin-shaped construction and is inserted into a bore in the brake disk.

12. The method according to claim 9, wherein the indicator element is connected with the brake disk by a silicon-carbide-containing layer.

13. A method of indicating a total load in a brake disk made of carbon-fiber-reinforced ceramic material, comprising:

providing an indicator element having an oxidation stability below that of the material of the brake disk, starting the indicator element from a friction surface of the brake disk, and determining an amount of indicator element burn-off.

14. The method according to claim 13, wherein the indicator element consists of a carbon material.

15. The method according to claim 13, wherein the indicator element has a pin-shaped construction and is inserted into a bore in the brake disk.

16. The method according to claim 13, wherein the indicator element is connected with the brake disk by a silicon-carbide-containing layer.

* * * * *